United States Patent
Rasmussen et al.

(10) Patent No.: US 9,494,985 B2
(45) Date of Patent: Nov. 15, 2016

(54) SYSTEM AND METHOD FOR ASSESSING AND MANAGING DATA CENTER AIRFLOW AND ENERGY USAGE

(75) Inventors: Neil Rasmussen, Concord, MA (US); James W. VanGilder, Pepperell, MA (US);
(Continued)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 13/532,901

(22) Filed: Jun. 26, 2012

(65) Prior Publication Data
US 2013/0030585 A1 Jan. 31, 2013

Related U.S. Application Data

(63) Continuation of application No. 12/277,715, filed on Nov. 25, 2008, now Pat. No. 8,209,056.

(51) Int. Cl.
*G05D 23/00* (2006.01)
*G06F 1/20* (2006.01)
(Continued)

(52) U.S. Cl.
CPC .......... *G06F 1/206* (2013.01); *G06F 17/5004* (2013.01); *H05K 7/20836* (2013.01);
(Continued)

(58) Field of Classification Search
USPC ................................ 700/275, 276, 286, 291
See application file for complete search history.

(56) References Cited

U.S. PATENT DOCUMENTS

| 4,823,290 A | 4/1989 | Fasack et al. |
| 4,962,734 A | 10/1990 | Jorgensen |

(Continued)

FOREIGN PATENT DOCUMENTS

| WO | 03081406 A1 | 10/2003 |
| WO | 2006119248 A2 | 11/2006 |

(Continued)

OTHER PUBLICATIONS

"Essential Cooling System Requirements for Next Generation Data Centers," White Paper #5, Revision 3, 2003 American Power Conversion, Rev 2002-3, pp. 1-10.
(Continued)

*Primary Examiner* — Carlos Ortiz Rodriguez
(74) *Attorney, Agent, or Firm* — Lando & Anastasi, LLP

(57) ABSTRACT

A system and method for providing energy assessment and optimization in a data center that includes at least one cooling provider, and at least one cooling consumer, the at least one cooling consumer having cooling requirements. The method according to one aspect includes receiving data regarding cooling availability and power consumption for the at least one cooling consumer, cooling capacity of the at least one cooling provider, and a physical relationship between the at least one cooling consumer and the at least one cooling provider in the data center, storing the received data, determining airflow distribution effectiveness between the at least one cooling consumer and the at least one cooling provider, and displaying at least one value representative of the effectiveness of the distribution of airflow in the data center between the at least one cooling consumer and the at least one cooling provider.

18 Claims, 10 Drawing Sheets

(75) Inventors: Xuanhang Zhang, Tewksbury, MA (US)

(51) Int. Cl.
*G06F 17/50* (2006.01)
*H05K 7/20* (2006.01)

(52) U.S. Cl.
CPC ....... *G06F 2217/16* (2013.01); *G06F 2217/34* (2013.01); *G06F 2217/80* (2013.01); *Y02B 60/1275* (2013.01)

(56) References Cited

U.S. PATENT DOCUMENTS

| | | |
|---|---|---|
| 5,462,225 A | 10/1995 | Massara et al. |
| 5,581,478 A | 12/1996 | Cruse et al. |
| 5,657,641 A | 8/1997 | Cunningham et al. |
| 5,682,949 A | 11/1997 | Ratcliffe et al. |
| 5,845,090 A | 12/1998 | Collins, III et al. |
| 5,850,539 A | 12/1998 | Cook et al. |
| 5,987,614 A | 11/1999 | Mitchell et al. |
| 5,995,729 A | 11/1999 | Hirosawa et al. |
| 6,055,480 A | 4/2000 | Nevo et al. |
| 6,216,956 B1 | 4/2001 | Ehlers et al. |
| 6,246,969 B1 | 6/2001 | Sinclair et al. |
| 6,347,627 B1 | 2/2002 | Frankie et al. |
| 6,374,627 B1 | 4/2002 | Schumacher et al. |
| 6,574,104 B2 | 6/2003 | Patel et al. |
| 6,672,955 B2 | 1/2004 | Charron |
| 6,694,759 B1 | 2/2004 | Bash et al. |
| 6,714,977 B1 | 3/2004 | Fowler et al. |
| 6,718,277 B2 | 4/2004 | Sharma |
| 6,721,672 B2 | 4/2004 | Spitaels et al. |
| 6,745,579 B2 | 6/2004 | Spinazzola et al. |
| 6,804,616 B2 | 10/2004 | Bodas |
| 6,819,563 B1 | 11/2004 | Chu et al. |
| 6,859,366 B2 | 2/2005 | Fink |
| 6,859,882 B2 | 2/2005 | Fung |
| 6,862,179 B2 | 3/2005 | Beitelmal et al. |
| 6,886,353 B2 | 5/2005 | Patel et al. |
| 6,889,908 B2 | 5/2005 | Crippen et al. |
| 6,964,539 B2 | 11/2005 | Bradley et al. |
| 6,967,283 B2 | 11/2005 | Rasmussen et al. |
| 6,967,841 B1 | 11/2005 | Chu et al. |
| 7,020,586 B2 | 3/2006 | Snevely |
| 7,031,870 B2 | 4/2006 | Sharma et al. |
| 7,032,119 B2 | 4/2006 | Fung |
| 7,051,946 B2 | 5/2006 | Bash et al. |
| 7,085,133 B2 | 8/2006 | Hall |
| 7,086,247 B2 | 8/2006 | Campbell et al. |
| 7,091,625 B2 | 8/2006 | Okusawa et al. |
| 7,104,081 B2 | 9/2006 | Chu et al. |
| 7,106,590 B2 | 9/2006 | Chu et al. |
| 7,112,131 B2 | 9/2006 | Rasmussen et al. |
| 7,120,021 B2 | 10/2006 | Hamman |
| 7,120,689 B2 | 10/2006 | Gonsalves et al. |
| 7,140,193 B2 | 11/2006 | Johnson et al. |
| 7,145,772 B2 | 12/2006 | Fink |
| 7,146,353 B2 | 12/2006 | Garg et al. |
| 7,148,796 B2 | 12/2006 | Joy et al. |
| 7,155,318 B2 | 12/2006 | Sharma et al. |
| 7,165,412 B1 | 1/2007 | Bean, Jr. |
| 7,173,820 B2 | 2/2007 | Fink et al. |
| 7,184,269 B2 | 2/2007 | Campbell et al. |
| 7,187,549 B2 | 3/2007 | Teneketges et al. |
| 7,197,433 B2 | 3/2007 | Patel et al. |
| 7,228,707 B2 | 6/2007 | Lifson et al. |
| 7,236,363 B2 | 6/2007 | Belady |
| 7,251,547 B2 | 7/2007 | Bash et al. |
| 7,313,503 B2 | 12/2007 | Nakagawa et al. |
| 7,315,448 B1 | 1/2008 | Bash et al. |
| 7,366,632 B2 | 4/2008 | Hamann et al. |
| 7,403,391 B2 | 7/2008 | Germagian et al. |
| 7,426,453 B2 | 9/2008 | Patel et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,620,480 B2 | 11/2009 | Patel et al. |
| 7,657,347 B2 | 2/2010 | Campbell et al. |
| 7,676,280 B1 | 3/2010 | Bash et al. |
| 7,726,144 B2 | 6/2010 | Larson et al. |
| 7,832,925 B2 | 11/2010 | Archibald et al. |
| 7,881,910 B2 | 2/2011 | Rasmussen et al. |
| 7,885,795 B2 | 2/2011 | Rasmussen et al. |
| 7,908,126 B2 | 3/2011 | Bahel et al. |
| 7,975,156 B2 | 7/2011 | Artman et al. |
| 7,979,250 B2 | 7/2011 | Archibald et al. |
| 7,991,592 B2 | 8/2011 | VanGilder et al. |
| 8,155,922 B2 | 4/2012 | Loucks |
| 8,219,362 B2 | 7/2012 | Shrivastava et al. |
| 8,229,713 B2 | 7/2012 | Hamann et al. |
| 8,244,502 B2 | 8/2012 | Hamann et al. |
| 8,249,825 B2 | 8/2012 | VanGilder et al. |
| 8,315,841 B2 | 11/2012 | Rasmussen et al. |
| 8,322,155 B2 | 12/2012 | Tutunoglu et al. |
| 8,327,656 B2 | 12/2012 | Tutunoglu et al. |
| 8,425,287 B2 | 4/2013 | Wexler |
| 8,473,265 B2 | 6/2013 | Hlasny et al. |
| 8,509,959 B2 | 8/2013 | Zhang et al. |
| 2002/0004912 A1 | 1/2002 | Fung |
| 2002/0059804 A1 | 5/2002 | Spinazzola et al. |
| 2002/0062454 A1 | 5/2002 | Fung |
| 2002/0072868 A1 | 6/2002 | Bartone et al. |
| 2003/0084357 A1 | 5/2003 | Bresniker et al. |
| 2003/0084358 A1 | 5/2003 | Bresniker et al. |
| 2003/0084359 A1 | 5/2003 | Bresniker et al. |
| 2003/0115000 A1 | 6/2003 | Bodas |
| 2003/0115024 A1 | 6/2003 | Snevely |
| 2003/0147216 A1 | 8/2003 | Patel et al. |
| 2003/0158718 A1 | 8/2003 | Nakagawa et al. |
| 2003/0188208 A1 | 10/2003 | Fung |
| 2003/0193777 A1 | 10/2003 | Friedrich et al. |
| 2003/0196126 A1 | 10/2003 | Fung |
| 2003/0200473 A1 | 10/2003 | Fung |
| 2003/0204756 A1 | 10/2003 | Ransom et al. |
| 2003/0236822 A1 | 12/2003 | Graupner et al. |
| 2004/0020224 A1 | 2/2004 | Bash et al. |
| 2004/0065097 A1 | 4/2004 | Bash et al. |
| 2004/0065104 A1 | 4/2004 | Bash et al. |
| 2004/0075343 A1 | 4/2004 | Wareham et al. |
| 2004/0075984 A1 | 4/2004 | Bash et al. |
| 2004/0089009 A1 | 5/2004 | Bash et al. |
| 2004/0089011 A1 | 5/2004 | Patel et al. |
| 2004/0163001 A1 | 8/2004 | Bodas |
| 2004/0230848 A1 | 11/2004 | Mayo et al. |
| 2004/0240514 A1 | 12/2004 | Bash et al. |
| 2004/0262409 A1 | 12/2004 | Crippen et al. |
| 2005/0023363 A1 | 2/2005 | Sharma et al. |
| 2005/0055590 A1 | 3/2005 | Farkas et al. |
| 2005/0108582 A1 | 5/2005 | Fung |
| 2005/0177755 A1 | 8/2005 | Fung |
| 2005/0182523 A1 | 8/2005 | Nair |
| 2005/0198981 A1 | 9/2005 | Arno |
| 2005/0225936 A1 | 10/2005 | Day |
| 2005/0228618 A1 | 10/2005 | Patel et al. |
| 2005/0267639 A1 | 12/2005 | Sharma et al. |
| 2006/0080001 A1 | 4/2006 | Bash et al. |
| 2006/0112286 A1 | 5/2006 | Whalley et al. |
| 2006/0121421 A1 | 6/2006 | Spitaels et al. |
| 2006/0139877 A1 | 6/2006 | Germagian et al. |
| 2006/0168975 A1 | 8/2006 | Malone et al. |
| 2006/0214014 A1 | 9/2006 | Bash et al. |
| 2006/0242288 A1 | 10/2006 | Masurkar |
| 2007/0038414 A1* | 2/2007 | Rasmussen et al. ............. 703/1 |
| 2007/0078635 A1 | 4/2007 | Rasmussen et al. |
| 2007/0088822 A1 | 4/2007 | Coile et al. |
| 2007/0150215 A1 | 6/2007 | Spitaels et al. |
| 2007/0174024 A1 | 7/2007 | Rasmussen et al. |
| 2007/0213000 A1 | 9/2007 | Day |
| 2007/0271475 A1 | 11/2007 | Hatasaki et al. |
| 2008/0004837 A1 | 1/2008 | Zwinger et al. |
| 2008/0041077 A1* | 2/2008 | Tutunoglu ............. 62/186 |
| 2008/0055850 A1 | 3/2008 | Carlson et al. |
| 2008/0104985 A1 | 5/2008 | Carlsen |

(56) References Cited

U.S. PATENT DOCUMENTS

| | | |
|---|---|---|
| 2008/0105412 A1 | 5/2008 | Carlsen et al. |
| 2008/0174954 A1 | 7/2008 | VanGilder et al. |
| 2008/0229318 A1 | 9/2008 | Franke |
| 2009/0121547 A1 | 5/2009 | Paik et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0205416 A1 | 8/2009 | Campbell et al. |
| 2009/0223234 A1 | 9/2009 | Campbell et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0106464 A1 | 4/2010 | Hlasny et al. |
| 2010/0211669 A1 | 8/2010 | Dalgas et al. |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |
| 2011/0213508 A1 | 9/2011 | Mandagere et al. |
| 2011/0246147 A1 | 10/2011 | Rasmussen et al. |
| 2012/0041569 A1 | 2/2012 | Zhang et al. |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2012/0245905 A1 | 9/2012 | Dalgas et al. |
| 2013/0006426 A1 | 1/2013 | Healey et al. |
| 2013/0139530 A1 | 6/2013 | Tutunoglu et al. |

FOREIGN PATENT DOCUMENTS

| | | |
|---|---|---|
| WO | 2007095144 A2 | 8/2007 |
| WO | 2008144375 A2 | 11/2008 |
| WO | 2009/014893 A1 | 1/2009 |
| WO | 2010068434 A1 | 6/2010 |
| WO | 2011/019615 A1 | 2/2011 |
| WO | 2012037427 A1 | 3/2012 |
| WO | 2012082985 A2 | 6/2012 |
| WO | 2012135038 A1 | 10/2012 |

OTHER PUBLICATIONS

"How and Why Mission-Critical Cooling Systems Differ From Common Air Conditions," White Paper #56, Revision 2, 2003 American Power Conversion, Rev 2003-2, pp. 1-13.
"Management Strategy for Network Critical Physical Infrastructure", White Paper #100, pp. 110, American Power Conversion, Dec. 15, 2003, published on World Wide Web.
Abi-Zadeh, Davar et al., "A Transient Analysis of Environmental Conditions for a Mission Critical Facility after a Failure of Power", Arup Mission Criticial Facilities, Feb. 2001, pp. 1-12.
Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.
APC User's Guide Brochure, "InfraStruXure Manager," Mar. 2004, 181 pgs.
Ashrae, "Thermal Guidelines for Data Processing Environments" 2004, Atlanta: American Society of Heating, Refrigerating, and Air-Conditioning Engineers, Inc., 2004, Atlanta.
Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
Chandrakant D. Patel, et al., "Thermal Considerations in Cooling Large Scale High Copute Density Data Centers" IEEE 2002, pp. 767-776.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Ehsan Pakabaznia et al., "Miminizing data center cooling and server power costs", Proceedings of the 14th ACM/IEEE International Symposium on Low Power Electronics and Design, ISLPED '09, Jan. 1, 2009, p. 145, XP55015368, New York, New York, USA, DOI: 10.1145/1594233.1594268, ISBN: 978-1-60-558684-7.
Herrlin, M.K., "Rack Cooling Effectiveness in Data Centers and Telecom Central Offices: The Rack Cooling Index (RCI)," ASHRAE Transaction, 2005, pp. 725-731, vol. 111(2).
Innovative Research, Inc., http://web.archive.org/web/20051221005029/http://www.inres.com/, Dec. 21, 2005, published on World Wide Web.
International Search Report for PCT/US2006/16739 mailed Oct. 3, 2006.
International Search Report for PCT/US2008/051908 mailed Jul. 3, 2008.
International Search Report for PCT/US2009/065700 mailed Feb. 18, 2010.
International Search Report for PCT/US2010/033867 mailed Jul. 7, 2010.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007, pp. 193-225, XP019499845, ISSN: 1573-7578, DOI:10.1007/S10619-006-7007-3.
K. Dunlap, "Cooling Audit for Identifying Potential Cooling Problems in Data Centers", White Paper #40, pp. 1-18, American Power Conversion, May 20, 2004, published on World Wide Web.
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.
Neil Rasmussen, "Air Distribution Architecture Options for Mission Critical Facilities," White Paper #55, Revision 1, 2003 American Power Conversion, Rev 2003-0, pp. 1-13.
Neil Rasmussen, "Avoidable Mistakes that Compromise Cooling Performance in Data Centers and Network Rooms," White Paper #49, 2003 American Power Conversion, Rev 2003-0, pp. 1-15.
Neil Rasmussen, "Cooling Options for Rack Equipment with Side-to-Side Airflow," White Paper #50, 2004 American Power Conversion, Rev 2004-0, pp. 1-14.
Neil Rasmussen, "Guidelines for Specification of Data Center Power Density," White Paper #120, 2005 American Power Conversion, Rev 2005-0, pp. 1-21.
Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.
Sharma, R.K, Bash, C.E, and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
VanGilder et al., "Airflow Uniformity thourhg Perforated Tiles in a Raised-Floor Data Center", White Paper 121, Jul. 17-22, 2005, 10 pages.
VanGilder, James W. et al., "Caputure index: an airflow-based rack cooling performance metric," 2007, ASHRAE Transactions, vol. 113, pp. 126-136.
VanGilder, James W. et al., "Real-Time prediction of rack-cooling performance," 2006, ASHRAE Transactions, vol. 112, pp. 151-162.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010, pp. 1-8, XP031702357.

(56) References Cited

OTHER PUBLICATIONS

Karki et al., "Techniques for controlling airflow distribution in raised-floor data centers," ASME 2003.
"Case Study, Application of TileFlow to Improve Cooling in a Data Center," Innovative Research, Inc., 2004.
Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.
Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008, pp. 1129-1142, ISSN: 0018-9340, DOI: 10.1109/TC.2008.52.
Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009, pp. 785-791.
Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000, pp. 90-98, ISBN: 978-0-7803-5912-3.
Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, November 13-19, 2009, Lake Buena Vista, Florida, USA, vol. 13: New Del, vol. 13, Jan. 1, 2009, pp. 41-50, DOI: 10.1115/IMECE2009-10806, ISBN: 978-0-7918-4386-4.
VanGilder, James, W., et al., "Real-time prediction of rack-cooling performance," 2006, ASHRAE Transactions, vol. 112, pp. 151-162.
VanGilder, James, W., et al., "Capture index: an airflow-based rack cooling performance metric," 2007, ASHRAE Transactions, vol. 113, pp. 126-136.
Australian Patent Examination Report No. 1 for Australian Patent Application No. 2009324936 issued Apr. 22, 2013, 3 pages.
EP097644108 European Examination Report, dated Aug. 13, 2013.

Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.
2nd Notification of Office Action in corresponding CN 200980147253.0 dated Nov. 5, 2013.
Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, In Proceedings of the 2nd Bangalore Annual Compute Conference (COMPUTE '09).
"Optimizing facility operation in high density data center environments," 2007, Hewlett-Packard Development Company, pp. 1-25.
Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s10619-005-0413-0.
Bemis et al, Data Center Airflow Modeling: Helps Facilities Planners Make Informed Decisions. Applied Math Modeling Inc. 2009 [retrieved on Apr. 19, 2012). Retrieved from the Internet: <URL: http:I/www.coolsimsoftware.com/wwwrooULinkCiick.aspx?fileticket=r1 SqFUDtRTk%3D&tabid=189> entire document.
Donald L. Beaty et al., "High Density Cooling of Data Centers and Telecom Facilities-Part 2," 2005, ASHRAE Transactions, vol. 111, pp. 932-944.
James W. VanGilder et al., "Partially decoupled aisle method for estimating rack-cooling performance in near-real time," 2007, Proceedings of the IPACK2007 ASME InterPACK07, pp. 781-789.
Modern Refrigeration and Air Conditioning (18th Edition) Althouse et al. Published by the Goodheart-Willcox Company, Inc. (c)2000.
Roger R. Schmidt et al., "Best practices for data center thermal and energy management-review of literature," ASHRAE Transactions, vol. 112, pp. 206-218 [2007].
Thermodynamics: An Engineering Approach (Fourth Edition) Cengel et al. Published by McGraw Hill (c)2004.
VanGilder, Real-Time Data Center Cooling Analysis, APC by Schneider Electric, Billerica, MA USA, Electronics Cooling, Sep. 2011, pp. 14-16.
Beitelmal et al., "Thermo-Fluids Provisioning of a High Pertormance High Density Data Center", Apr. 22, 2006, Springer Science and Business Media, Inc, Distributed and Parallel Databases, 21, pp. 227-238 DOI:1 0.1 007/s10619-005-0413-0.

\* cited by examiner

US 9,494,985 B2

SYSTEM AND METHOD FOR ASSESSING AND MANAGING DATA CENTER AIRFLOW AND ENERGY USAGE

RELATED APPLICATIONS

This application is a continuation of and claims the benefit under 35 U.S.C. §120 of U.S. application Ser. No. 12/277,715, entitled "SYSTEM AND METHOD FOR ASSESSING AND MANAGING DATA CENTER AIRFLOW AND ENERGY USAGE," filed on Nov. 25, 2008, which is herein incorporated by reference in its entirety.

BACKGROUND

1. Field of the Invention

At least one embodiment in accordance with the present invention relates generally to systems and methods for data center management assessment, and more specifically, to systems and methods for managing data center airflow and energy usage.

2. Discussion of Related Art

In response to the increasing demands of information-based economies, information technology networks continue to proliferate across the globe. One manifestation of this growth is the centralized network data center. A centralized network data center typically consists of various information technology (IT) equipment, collocated in a structure that provides network connectivity, electrical power and cooling capacity. In a typical data center, only about half of the energy consumption goes directly to IT loads. The remainder is consumed in the power and cooling infrastructure with the cooling equipment consuming the majority.

Various processes and software applications, such as the InfrastruXure® Central product available from American Power Conversion Corporation of West Kingston, R.I., have been developed to aid data center personnel in designing and maintaining efficient and effective of data centers configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY OF THE INVENTION

One aspect of the invention is directed to a computer-implemented method for providing energy assessment and optimization in a data center that includes at least one cooling provider, and at least one cooling consumer, the at least one cooling consumer having cooling requirements. The method includes receiving data regarding cooling availability and power consumption for the at least one cooling consumer, cooling capacity of the at least one cooling provider, and a physical relationship between the at least one cooling consumer and the at least one cooling provider in the data center, storing the received data, determining at least one value representative of the effectiveness of the distribution of airflow in the data center between the at least one cooling consumer and the at least one cooling provider, and displaying the at least one value representative of the effectiveness of the distribution of airflow in the data center between the at least one cooling consumer and the at least one cooling provider.

The method may further include displaying at least one optimized setting for the at least one cooling provider that results in a reduction in energy usage of the data center while satisfying the cooling requirements of the cooling consumer. The at least one optimized setting may be an airflow setting of the at least one cooling provider. The at least one optimized setting may relate to temperature of a coolant supplied to the at least one cooling provider. The method may further include adjusting the at least one optimized setting for the at least one cooling provider to reduce energy usage of the data center. Adjusting the at least one optimized setting may include adjusting an airflow setting of the at least one cooling provider. Adjusting the at least one optimized setting may include adjusting temperature of a coolant supplied to the at least one cooling provider, and may include adjusting an airflow setting of the at least one cooling provider and adjusting temperature of a coolant supplied to the at least one cooling provider. The at least one cooling consumer may include a plurality of equipment racks in the data center, and the at least one cooling provider may include a plurality of coolers, and the method may further include creating a model of the data center with the plurality of equipment racks represented by a single equipment rack and the plurality of coolers represented by a single cooler, and determining lumped cooling availability and power consumption for the single equipment rack, based on characteristics of each of the plurality of equipment racks, and determining lumped cooling capacity of the single cooler based on characteristics of the plurality of coolers, wherein determining at least one value representative of the effectiveness of the distribution of airflow includes determining at least one value representative of the effectiveness of the distribution of airflow between the single equipment rack and the single cooler. The method may further include providing a user interface on a computer screen, wherein the user interface includes user selectable elements to adjust settings for the at least one cooling provider, receiving input from a user to adjust the settings for the at least one cooling provider, and providing an updated value representative of the effectiveness of the distribution of airflow in the data center between the at least one cooling consumer and the at least one cooling provider in real time based on the input received. The method may further include determining the at least one optimized setting based at least in part on any fractional increase in power due to an increase in fan speed of at least one server in the data center.

Another aspect of the invention is directed to a system for presenting a cooling model of a data center that includes at least one cooling provider, and at least one cooling consumer, the at least one cooling consumer having cooling requirements. The system includes an interface, and a controller configured to receive data regarding cooling availability and power consumption for the at least one cooling consumer, cooling capacity of the at least one cooling provider, and a physical relationship between the at least one cooling consumer and the at least one cooling provider in the data center, store the received data, determine at least one value representative of the effectiveness of the distribution of airflow in the data center between the at least one cooling consumer and the at least one cooling provider, and display on the interface the at least one value representative of the effectiveness of the distribution of airflow in the data center between the at least one cooling consumer and the at least one cooling provider.

The controller may be further configured to display on the interface at least one optimized setting for the at least one cooling provider that results in a reduction in energy usage of the data center while meeting the cooling requirements of the at least one cooling consumer, and the at least one optimized setting may be an airflow setting of the at least one cooling provider. The at least one optimized setting may relate to temperature of a coolant supplied to the at least one cooling provider. The controller may be further configured to adjust the at least one optimized setting for the at least one cooling provider to reduce energy usage of the data center, and the controller may be configured to adjust an airflow setting of the at least one cooling provider to reduce energy usage of the data center, and to adjust temperature of a coolant supplied to the at least one cooling provider. The controller may also be configured to adjust an airflow setting of the at least one cooling provider and adjust temperature of a coolant supplied to the at least one cooling provider. The at least one cooling consumer may include a plurality of equipment racks in the data center, and the at least one cooling provider may includes a plurality of coolers, and the controller may be further configured to create and display on the interface a model of the data center with the plurality of equipment racks represented by a single equipment rack and the plurality of coolers represented by a single cooler, and determine lumped cooling availability and power consumption for the single equipment rack, based on characteristics of each of the plurality of equipment racks, and determine lumped cooling capacity of the single cooler based on characteristics of the plurality of coolers. The controller may be further configured to display on a computer screen of the user interface graphics that include user selectable elements to adjust settings for the at least one cooling provider, receive input from a user to adjust the settings for the at least one cooling provider, and provide an updated value representative of the effectiveness of the distribution of airflow in the data center between the at least one cooling consumer and the at least one cooling provider in real time based on the input received. The controller may be configured to determine the at least one optimized setting based at least in part on any fractional increase in power due to an increase in fan speed of at least one server in the data center.

Another aspect of the invention is directed to a computer readable medium. The computer readable medium has stored thereon sequences of instruction including instructions that will cause a processor to receive data regarding cooling availability and power consumption for at least one cooling consumer, cooling capacity for at least one cooling provider, and a physical relationship between the at least one cooling consumer and the at least one cooling provider in a data center, store the received data, determine at least one value representative of the effectiveness of the distribution of airflow in the data center between the at least one cooling consumer and the at least one cooling provider, and provide output to display on an interface the at least one value representative of the effectiveness of the distribution of airflow in the data center between the at least one cooling consumer and the at least one cooling provider.

The sequences of instruction may include instructions that will cause the processor to display on the interface at least one optimized setting for the at least one cooling provider that results in a reduction in energy usage of the data center while meeting the cooling requirements of the cooling consumer. The at least one optimized setting may be an airflow setting of the at least one cooling provider. The at least one optimized setting may relate to temperature of a coolant supplied to the at least one cooling provider. The sequences of instruction may include instructions that will cause the processor to provide an output to adjust the at least one optimized setting for the at least one cooling provider to reduce energy usage of the data center. The sequences of instruction may include instructions that will cause the processor to provide an output to adjust an airflow setting of the at least one cooling provider to reduce energy usage of the data center. The sequences of instruction may also include instructions that will cause the processor to provide an output to adjust temperature of a coolant supplied to the at least one cooling provider. The sequences of instruction may include instructions that will cause the processor to provide an output to adjust an airflow setting of the at least one cooling provider and adjust temperature of a coolant supplied to the at least one cooling provider. The sequences of instruction may further include instructions that will cause the processor to create and display on the interface a model of a data center with a plurality of equipment racks represented by a single equipment rack and a plurality of coolers represented by a single computer room air conditioner, and determine lumped cooling availability and power consumption for the single equipment rack, based on characteristics of each of the plurality of equipment racks, and determine lumped cooling capacity of the single cooler based on characteristics of the plurality of coolers, and determine at least one value representative of the effectiveness of the distribution of airflow in the data center between the single equipment rack and the single cooler. The sequences of instruction may include instructions that will cause the processor to provide data to the interface to display graphics that include user selectable elements to adjust settings for the at least one cooling consumer, receive input from a user to adjust the settings for the at least one cooling consumer, and provide an updated value representative of the effectiveness of the distribution of airflow in the data center between the at least one cooling consumer and the at least one cooling provider in real time based on the input received. The sequences of instruction may include instructions that will cause the processor to determine the at least one optimized setting based at least in part on any fractional increase in power due to an increase in fan speed of at least one server in the data center.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
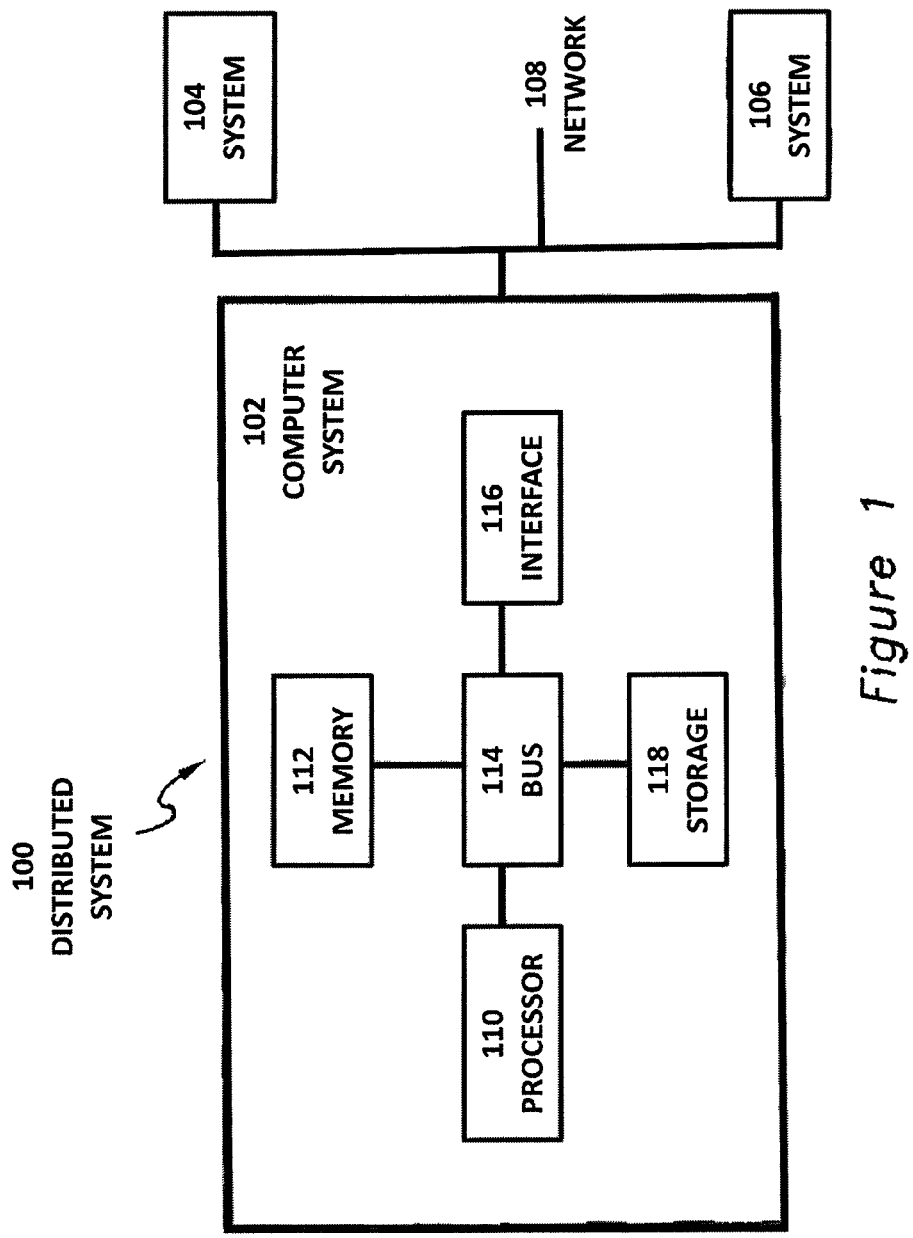
FIG. 1 shows an example computer system with which various aspects in accord with the present invention may be implemented.

Aspects of the present invention disclosed herein, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

At least some embodiments in accordance with the present invention relate to systems and processes through which a user may assess the airflow and energy usage in a data center, and modify parameters of equipment in the data center to optimize airflow and energy usage. As discussed above, only about half of the energy consumption in a data center goes directly to the IT loads. The remainder is consumed in the power and cooling infrastructure with the cooling equipment consuming the majority of this energy. Within the cooling equipment itself, the majority of power consumption is by the chiller and Computer Room Air Conditioner (cooler) fans. Even a modest increase in the chilled water temperature of the chiller, or a modest reduction in fan speed (and airflow rate) can result in large energy savings.

A full energy analysis of a data center typically requires the use of complex computational fluid dynamics (CFD) software along with finely detailed input data of characteristics of the data center. Such an analysis can be very expensive, require highly skilled personnel, and may take days or weeks to produce high quality results.

At least one embodiment of the present invention provides a method and a system for performing airflow and energy-use assessments in real-time without specially trained personnel. In embodiments of the invention discussed herein, the performance of assessments and calculations in real-time refers to processes that are completed in a matter of a few seconds or less rather than several minutes or longer as can happen with complex CFD calculations. The ability to perform assessments quickly and inexpensively is particularly beneficial in performing multiple assessments as part of an optimization process.

Embodiments of the invention may be implemented in one or more computer systems. For example, according to one embodiment of the present invention, a computer system is configured to perform any of the functions described herein, including but not limited to, configuring, modeling, assessing and presenting information regarding specific data center configurations. However, such a system may also perform other functions, such as suggesting changes to data center configurations, based on, for example, industry best practices, and may also provide suggestions for and implement changes to the cooling system including one or more chillers and one or more coolers. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present invention may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copies the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accordance with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C–, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present invention may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

A computer system included within an embodiment may perform additional functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
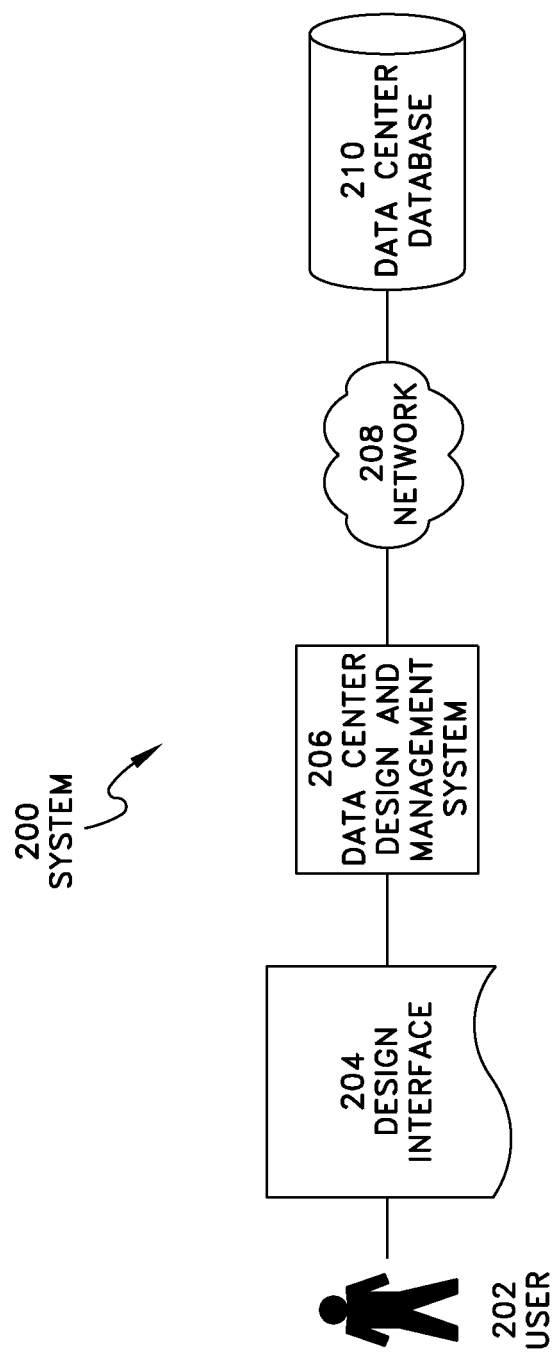
FIG. 2 illustrates an example distributed system including an embodiment.

FIG. 2 presents a context diagram including physical and logical elements of distributed system 200. As shown, distributed system 200 is specially configured in accordance with the present invention. The system structure and content recited with regard to FIG. 2 is for exemplary purposes only and is not intended to limit the invention to the specific structure shown in FIG. 2. As will be apparent to one of ordinary skill in the art, many variant system structures can be architected without deviating from the scope of the present invention. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data. As illustrated, data center design and management system 206 may exchange information with data center database 210 via network 208. This information may include any information required to support the features and functions of data center design and management system 206. For example, in one embodiment, data center database 210 may include at least some portion of the data stored in the data center equipment database described in PCT/US08/63675. In another embodiment, this information may include any information required to support interface 204, such as, among other data, the physical layout of one or more data center model configurations, the production and distribution characteristics of the cooling providers included in the model configurations, the consumption characteristics of the cooling consumers in the model configurations and one or more cooling metrics characterizing the amount of cool air produced by the cooling providers that is lost prior to being consumed by the cooling consumers.

In one embodiment, data center database 210 may store types of cooling providers, the amount of cool air provided by each type of cooling provider, and a temperature of cool air provided by the cooling provider. Thus, for example, data center database 210 includes record of a particular type of cooling unit that is rated to deliver airflow at the rate of 5,600 cfm at a temperature of 68 degrees Fahrenheit. In addition, the data center database 210 may store one or more cooling metrics, such as inlet and outlet temperatures of the coolers and inlet and outlet temperatures of one or more equipment racks. The temperatures may be periodically measured and input into the system, or in other embodiments, the temperatures may be continuously monitored using devices coupled to the system 200.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Data Center Assessment and Optimization Embodiments

In at least one embodiment, which will now be described, data center airflow and energy assessments are performed based on a novel data center performance characteristic identified as Air Distribution Effectiveness (ADE), which relates equipment rack inlet temperatures to cooler airflow rate by a relationship which is determined based on the type of cooling architecture that is used (e.g., in-row, raised floor, overhead supply, etc.) In other embodiments other airflow metrics other than ADE may be used. ADE characterizes a facility's effectiveness at delivering cooling airflow to IT equipment racks, and in at least one embodiment, the ADE for a facility, as described below in greater detail, is computed from simple temperature measurements along with an estimate of total IT load. The ADE may be expressed as a single number between 0% (indicating poor performance) and 100% (indicating satisfactory performance). With a known ADE, in embodiments of the invention, chilled water supply temperature and cooler airflow can be adjusted to maximize energy savings while maintaining acceptable equipment rack inlet temperatures.

In one embodiment, which will now be described in detail, the data center design and management system 200 is configured to perform a process that determines ADE for a facility and provides tools implemented as graphical user interfaces that allow a user to optimize energy savings associated with cooling IT equipment in a facility. In this embodiment, calculations for a data center are performed by first producing a model of the data center as one cooler and one IT equipment rack. The single lumped cooler airflow and supply and return temperatures are equal to the actual cooler airflow and average supply and return temperatures respectively. Similarly, the single lumped rack airflow and inlet and exhaust temperatures are equal to the actual total rack airflow and average inlet and exhaust temperatures respectively. As discussed below in greater detail, inputs to the tool include measured temperatures, along with parameters associated with the facility's chillers, coolers and IT equipment racks. Also, the user can set a maximum inlet temperature for the IT equipment racks. The tool determines an "r" factor (described below), and based on the r factor and the other parameters, computes the facility's optimized air ratio (AR), which is defined as the ratio of total cooler airflow to total IT load airflow. The "r" factor is an empirically-determined factor related to the coupling that exists in a facility between the airflow output from the facility's coolers, and the airflow input to the facility's IT equipment racks.

Figure 3:
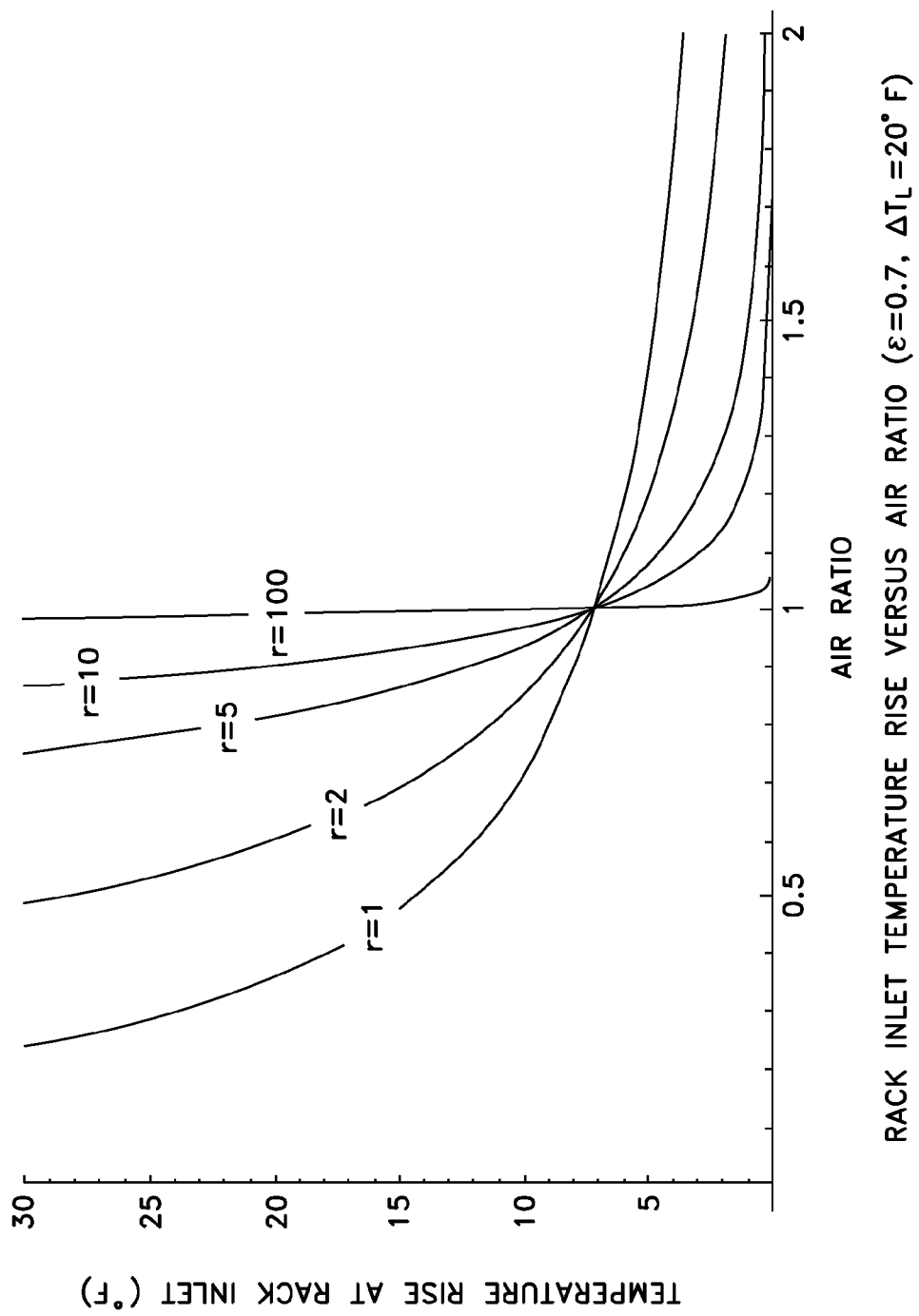
FIG. 3 shows a graph comparing rack inlet temperature rise verses air ratio.

In a data center, as well understood by one of ordinary skill in the art, the average temperature at the inlet side of an IT equipment rack $T_i$ relative to the cooler supply temperature $T_s$, defined as $\Delta T_{IT} = T_i - T_s$, may change gradually or very rapidly with changes in the air ratio (AR) depending on the coupling factor r. FIG. 3 demonstrates how the inlet temperature of equipment racks varies with changes in air ratio for different r values. For a facility in which the airflow is extremely well mixed (for example, a facility with upflow cooling units or ceiling diffusers), r is low and the temperature rise is substantially inversely proportional (r=1) to the air ratio (AR). For a well-designed raised floor facility, it has been found that r may be as great as 5, such that the relationship is $1/AR^5$.

The Air Distribution Effectiveness (ADE or ε), mentioned above, may be calculated using equation (1) below:

$$\varepsilon = e^{\frac{-\Delta T_{IT} AR^r}{\Delta T_L}} \quad \text{Equation (1)}$$

where $\Delta T_L = T_e - T_i$ is the (airflow-weighted) average temperature rise across the IT racks, with $T_e$ being the temperature of air exiting from the rack and $T_i$ being the temperature of air entering the rack. Solving (1) for $\Delta T_{IT}$ results in equation (2) below:

$$\Delta T_{IT} = \frac{-\ln \varepsilon \Delta T_L}{AR^r} \quad \text{Equation (2)}$$

The graph in FIG. 3 shows the relationship between the temperature rise at the equipment rack inlet for several different values of r based on equation 2 with ε=0.7 and $\Delta T_L = 20°$ F.

From equation (1), it is seen that for a very large AR (for example approaching infinity), the Air Distribution Effectiveness ε goes to zero, showing that the cooling distribution becomes ineffective as the air ratio gets very large. Further, as $\Delta T_{IT}$ approaches zero, the Air Distribution Effectiveness ε approaches 1, showing that the cooling distribution is more effective the closer $\Delta T_{IT}$ is to zero. Finally, as $\Delta T_L$ gets large, the Air Distribution Effectiveness ε approaches one, implying that, for a fixed AR and $\Delta T_{IT}$, the greater the IT load the more effective the cooling architecture.

Based on the foregoing, it is readily apparent to one of ordinary skill in the art, that the value of the Air Distribution Effectiveness, for a given data center family (fixed r value), is a single number between 0 and 1 (or, alternatively, a percentage between 0% and 100%) which is independent of IT load and air ratio that assesses the facility's ability to deliver cooling airflow to the IT equipment. Thus, it is meaningful to compare the Air Distribution Effectiveness between facilities of similar architecture but it is not meaningful to compare the ADE of a facility that uses InRow cooling to the ADE of a facility that uses upflow cooling. In addition to serving as a valuable assessment metric for a facility, the Air Distribution Effectiveness concept provides a link between IT load inlet temperature and AR (Equation 2) which is useful in embodiments of the invention to optimize AR and chilled water temperature settings while respecting the rack inlet temperature limit without the need for complex CFD calculations.

In embodiments of the present invention, in addition to Air Distribution Effectiveness, other metrics have been developed and are used to analyze the cooling effectiveness of a facility. These metrics include Bypass Ratio (BR) and Recirculation Ratio (RR). The Bypass Ratio and Recirculation Ratio are determined using Equations (3) and (4) below:

$$BR = \frac{T_e - T_i}{T_e - T_s} = \frac{\text{Bypass airflow}}{\text{CRAC supply airflow}} \quad \text{Equation (3)}$$

$$RR = \frac{T_i - T_s}{T_e - T_s} = \frac{\text{Recirculation airflow}}{\text{Total IT airflow}} \quad \text{Equation (4)}$$

Unlike Airflow Distribution Effectiveness, BR and RR vary with air ratio. More specifically, the amount of bypass and recirculated airflow will change with changes in cooler airflow.

As discussed above, methods and systems in accordance with embodiments of the invention may be used to provide energy savings in a facility by allowing increases in the chilled water temperature and decreases in the cooler airflow, while maintaining satisfactory cooling of IT equipment. As discussed in "Cooling Solutions for IT: A Guide to Planning, Design and Operation, BSRIA Guidance," Note BG, May, 2003, by N. Pavey, et al. for every 1 degree C. increase in chilled water temperature, about 3.5% of the chiller power can be saved. This statement can be expressed in dimensionless form for temperatures in degrees F. by Equation (5) below:

$$\frac{P_{c1} - P_{c2}}{P_{c1}} = 0.39 \frac{T_{c2} - T_{c1}}{\Delta T_{ref}} \quad \text{Equation (5)}$$

where $\Delta T_{ref} = 20°$ F.=11.1° C.

In Equation (5), $P_C$ is the chiller power and $T_C$ is the chiller water temperature. The subscripts "1" and "2" refer to current and alternative operating points respectively.

As is known, in a typical cooler, fan power increases with the cube of airflow rate, and accordingly, the total fan power savings as a result of lowering the airflow rate of a cooler can be expressed using Equation (6) below:

$$\frac{P_{f1} - P_{f2}}{P_{f1}} = 1 - \left(\frac{AR_2}{AR_1}\right)^3 \quad \text{Equation (6)}$$

In Equation (6), $P_F$ is fan power, and the subscripts "1" and "2" refer to current and alternative operating points. The Total Fractional Power Savings (TFPS) for a configuration in a facility may then be determined in embodiments of the invention using Equation (7). Equation (7) results from combining Equations (5) and (6).

$$TFPS = \left(0.39 \frac{T_{c2} - T_{c1}}{\Delta T_{ref}}\right)\left(\frac{P_{c1}}{P_{c1} + P_{f1}}\right) + \left\{1 - \left(\frac{AR_2}{AR_1}\right)^3\right\}\left(\frac{P_{f1}}{P_{c1} + P_{f1}}\right) \quad \text{Equation (7)}$$

The optimal operating point from an energy perspective is determined in at least some embodiments by maximizing Equation (7) subject to certain constraints and assumptions. In a simple embodiment, it is assumed that the temperature difference between the cooler supply and the chilled water remains constant as the chilled water temperature is varied ($T_e - T_s$=constant). In other embodiments, the cooler supply temperature is computed more accurately using well-known heat exchanger-analysis techniques such as the Log Mean Temperature Difference (LMTD) or $\epsilon$-NTU methods. Thus, variations in the chilled water temperature from the chiller result in a variation in temperature of the supply airflow from the cooler. It is also assumed that the supply temperature is limited by the maximum allowable rack inlet temperature. This limit for the supply temperature can be determined by expressing Equation (2) above, in the form shown by Equation (8) below:

$$T_{s2} \leq T_{max} + \frac{\ln \varepsilon \Delta T_L}{AR_2^r} \quad \text{Equation (8)}$$

In Equation (8), $T_{max}$ is the maximum allowable input temperature for the IT equipment racks, which is set by the user in at least some embodiments, and $T_{s2}$ is the resulting optimized temperature of the supply air from the cooler. In some embodiments of systems and tools that implement the above described optimization process, additional constraints on values may be imposed by the user. For example, the user may impose additional upper and lower limits on $AR_2$ and $T_{c2}$ based on practical considerations. For example, the data center may be served by a campus-wide chiller system that does not accommodate changes to $T_c$. Further, in at least some embodiments, a user is not permitted to set the cooler return temperature to be higher than the equipment rack exhaust temperature.

In one embodiment, a software tool determines the optimum $T_{c2}$ and $AR_2$ using Excel Solver; however in other embodiments, other techniques, including non-linear methods, such as "steepest ascent" or "Newton directions" may be used. In other embodiments, approximate results can also be found by compiling a table of possible air ratio and coolant temperature combinations then searching through the points to find the best feasible pairing in the table with respect to a design goal such as minimizing energy consumption.

Figure 4:
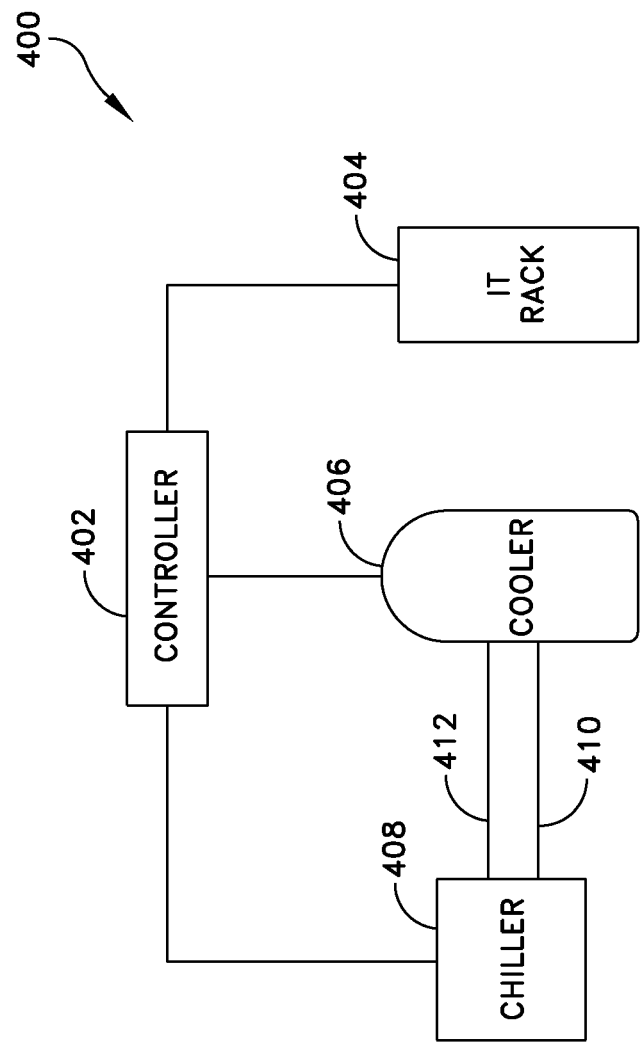
FIG. 4 shows a basic block diagram of a data center.

Embodiments of the present invention will now be described in further detail with reference to FIGS. 4-7. FIG. 4 shows a basic block diagram representing a model of a data center 400. The data center includes a controller 402, an equipment or IT rack 404, a cooler 406 and a chiller 408. The controller 402 is coupled to the cooler 406 and the chiller 408 to monitor and control parameters of each. The controller 402 is also coupled to the equipment rack 404, and more particularly, may be coupled to one or more sensors internal and/or external to the equipment rack to measure air temperatures and monitor power of the equipment rack 404. The coupling between the controller and the other equipment may be accomplished using one or more computer networks as discussed above, and additional controllers may be used. The chiller is coupled to the cooler 406 using input and return coolant lines 410 and 412. As is well known, the chiller may be located outside the data center. In the model shown in FIG. 4, as discussed above, the cooler 406 and the equipment rack 404 may be representative of multiple coolers and equipment racks contained in a data center, and the controller may be coupled to the multiple coolers and equipment racks to monitor performances of each cooler and equipment rack. In one embodiment, the controller 402 may be part of a data center design and management system such as system 206, shown in FIG. 2, and the system may be programmed to provide a software tool operable by a user to optimize the chiller water temperature and the cooler airflow using principles described above and further described below.

Figure 5:
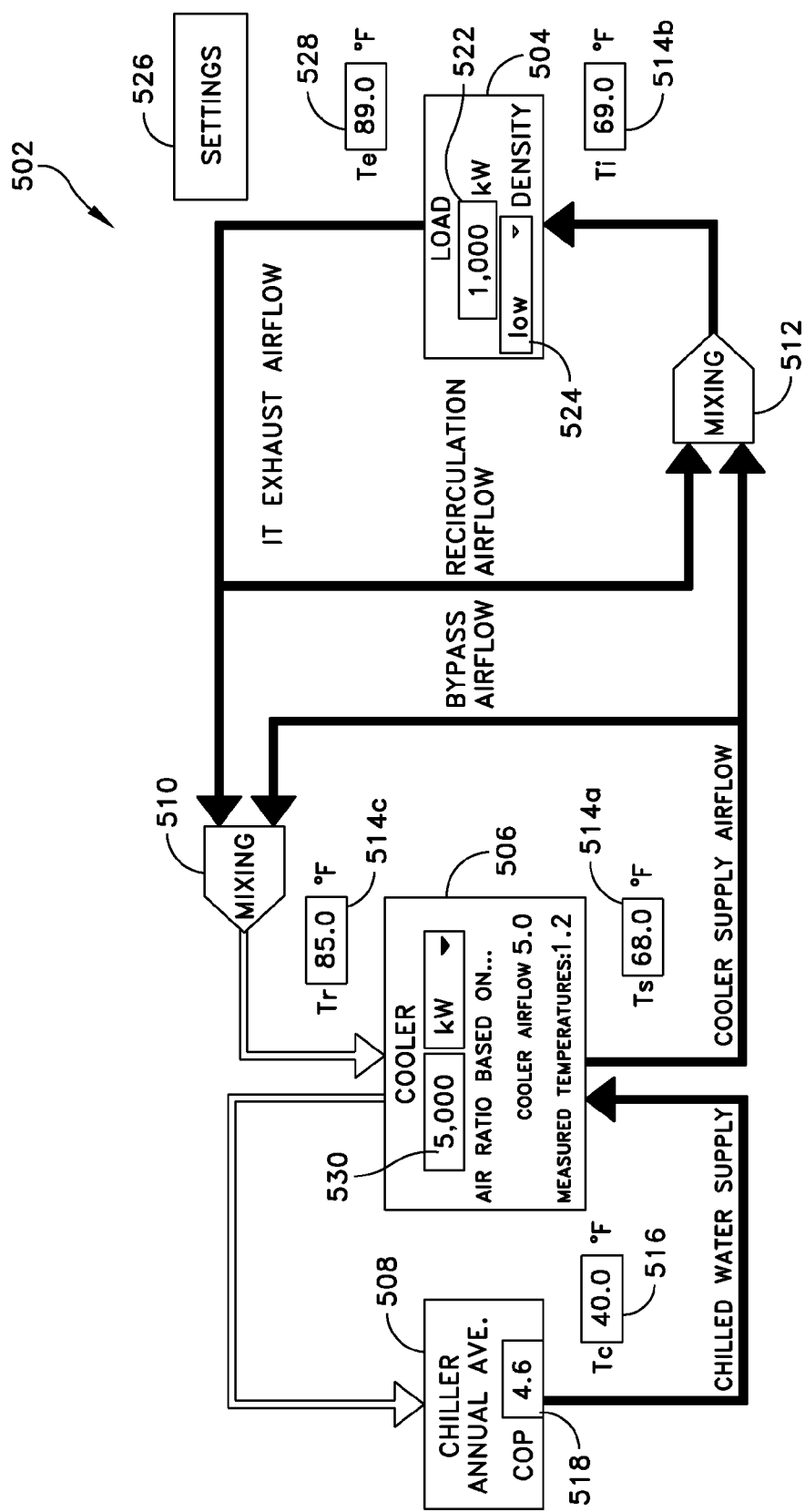
FIG. 5 shows an airflow diagram that may be used as part of a user interface in at least one embodiment of the invention.
Figure 6:
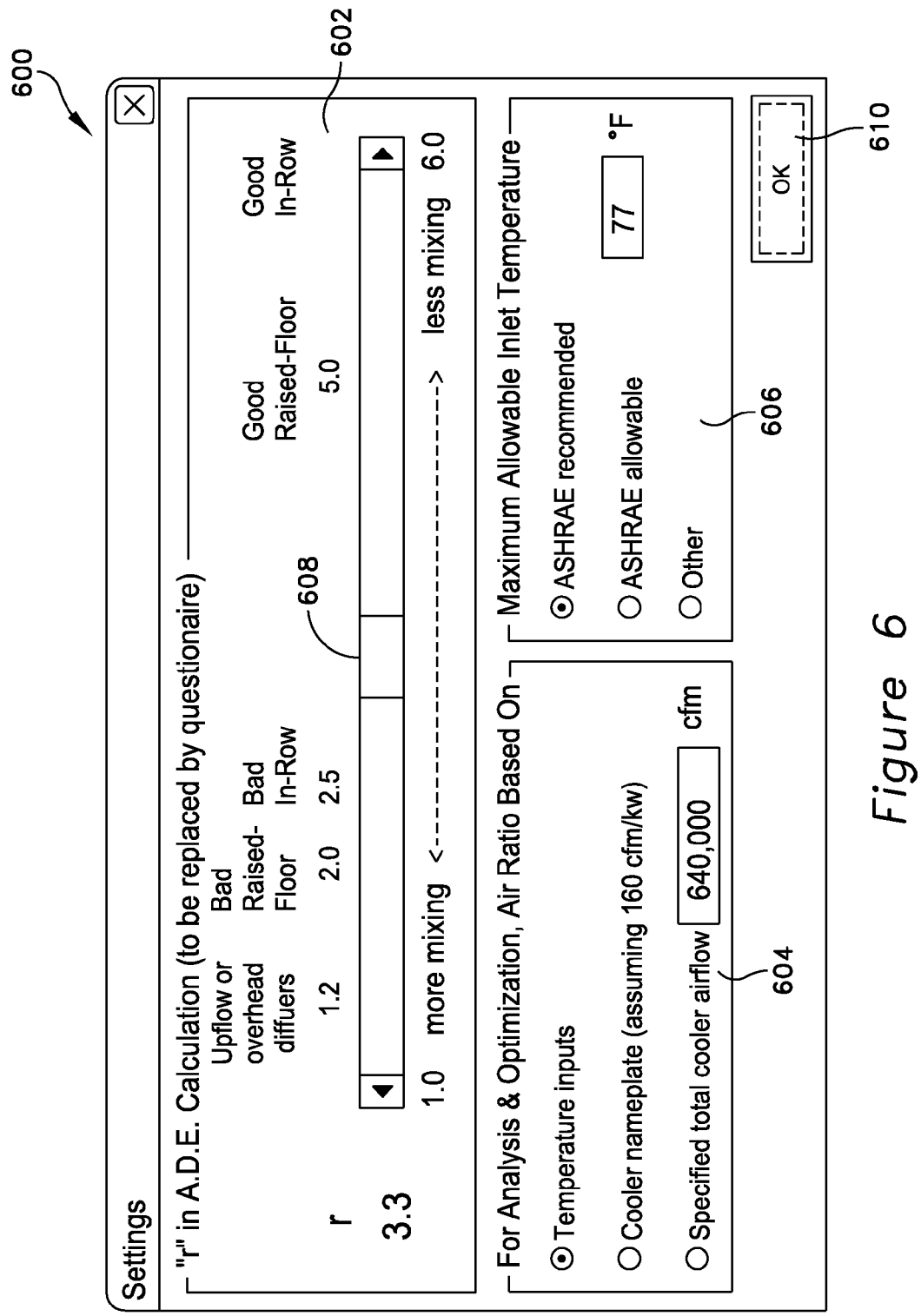
FIG. 6 shows a graphical user interface that may be used in one embodiment to input settings into a software tool.
Figure 7:
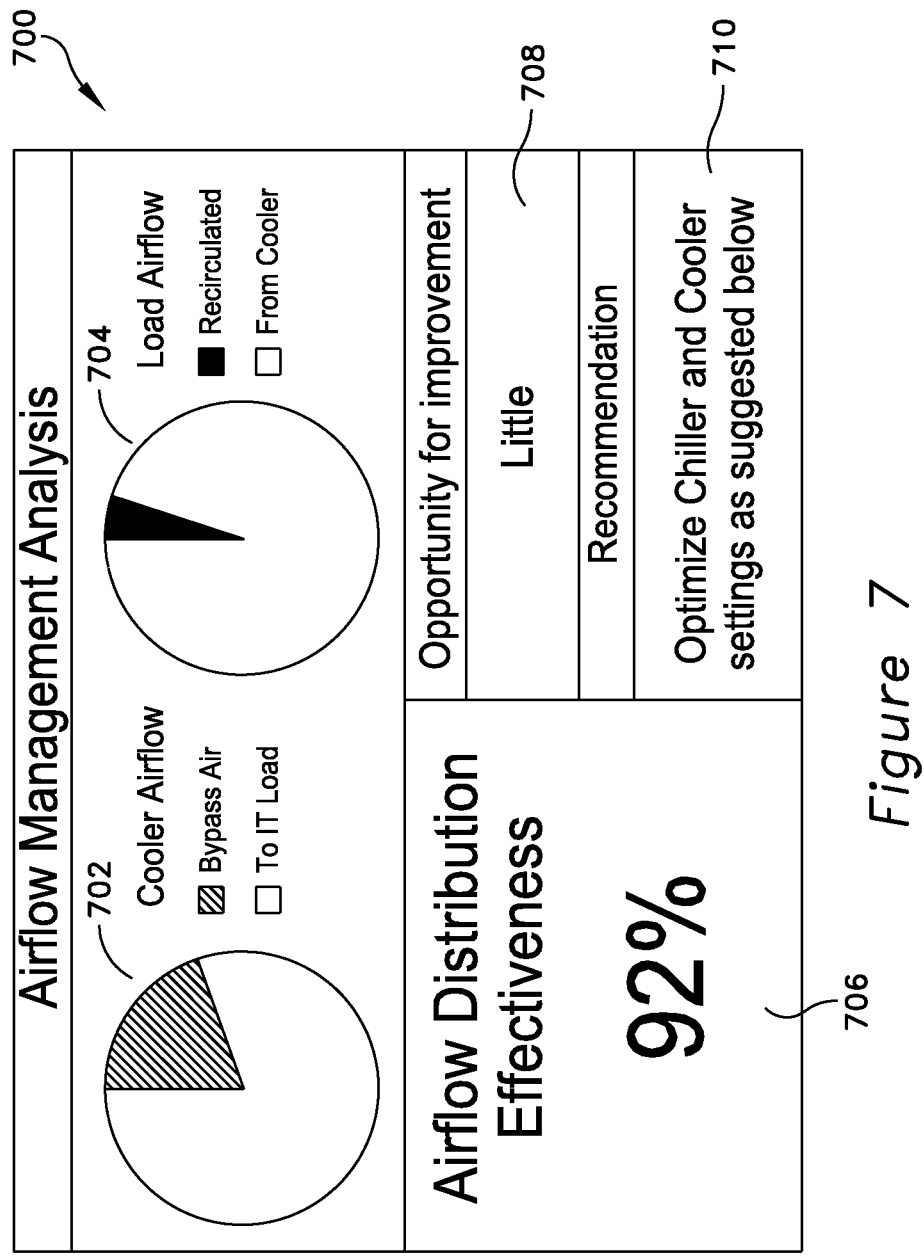
FIG. 7 shows a graphical user interface that may be used to display results of one or more processes conducted in accordance with one embodiment of the invention.

FIG. 5 provides an airflow diagram 502 used in a software tool of one embodiment to provide a representation of the data center 400 to the user and to provide data input blocks for the user to input data to the tool. The airflow diagram 502 may be used to represent multiple equipment racks and coolers in a data center as described above with the racks lumped together and represented in the diagram as a single rack, and the coolers lumped together and represented as a single cooler. The airflow diagram may be presented to the user as part of a graphical user interface. The airflow diagram includes an equipment rack 504, a cooler 506, and a chiller 508. The flow of chilled water (or some other coolant) and the flow of air in the data center are shown in the airflow diagram 502. Two air mixing blocks 510 and 512 are also shown in the airflow diagram. Mixing block 510 is used to represent the undesirable mixing of bypass air from the cooler with return air from the load, and mixing block 512 is used to represent the undesirable mixing of recirculated air from the load with air from the cooler.

The flow diagram 502 includes three air temperature input boxes 514a, 514b and 514c, which respectively represent the air temperature at the output of the cooler, at the input of the load, and at the input to the cooler. In one embodiment, a user inserts temperature values into each of the boxes that are representative of average cooler and equipment rack temperature values measured in a data center. In other embodiments, the controller 402 may automatically gather temperature values from sensors placed in a data center and average the values received. In this embodiment, while average values are used for the input temperature to the load, it is actually the maximum inlet temperature that can not be exceeded for proper cooling to occur. In other embodiments, particularly when there are large variations in equipment rack inlet air temperature measurements, it may be desirable to insert a maximum measured value in box 514*b* in place of the average value. The user may also be provided with a number of best-practice-type suggestions that may be implemented in the data center in order to drive maximum rack inlet temperatures closer to the average values. Also, in other embodiments, techniques other than averaging may be used to lump parameters.

The flow diagram also includes an input box 516 in which a user inserts a value for the coolant temperature of the facility's chiller, and the diagram includes an input box 518 in which the Coefficient of Performance (COP), defined as the ratio of the rate of heat removal to the power input of the chiller, is entered. The flow diagram includes boxes 522 and 524 in which characteristics of the equipment racks are entered. In box 522 the total power draw of the load is entered, and in box 524, the user indicates whether the equipment racks are low, medium or high density racks, which is used to estimate the rack airflow. In another embodiment, the user may be prompted to enter the relative fractions of different IT equipment types (e.g. 1U servers, blade servers, etc.) Value box 528 provides a value for the temperature of air exiting the equipment rack. The value in box 528 is calculated based on the average input temperature, the total load and the total airflow rate of the equipment racks. The flow diagram also includes an input box 530 in the cooler 506. Input box 530 is used to input the total output in kW of the coolers.

After inputting the information into the airflow diagram, the user may press the settings box 526 to enter further information into the tool. Activation of the settings button results in the settings screen 600 shown in FIG. 6 to be displayed. As with the airflow diagram above, the settings screen may be presented to a user as part of a graphical user interface. The settings screen includes three data input areas including an "r" calculation input area 602, an air ratio basis input area 604, and a maximum inlet temperature area 606. Area 602 is used to determine the r value for optimization calculations to be performed by the tool. The factor r is described in greater detail above. In the embodiment shown, r will have a value between 1.0 and 6.0 depending on the user's positioning of button 608 in the sliding scale based on characteristics of the data center and the amount of air mixing likely to occur in the data center. In other embodiments, in place of the button and sliding scale, the user may be presented with a set of questions regarding the data center, and the tool produces the r value based on answers provided by the user.

Figure 8:
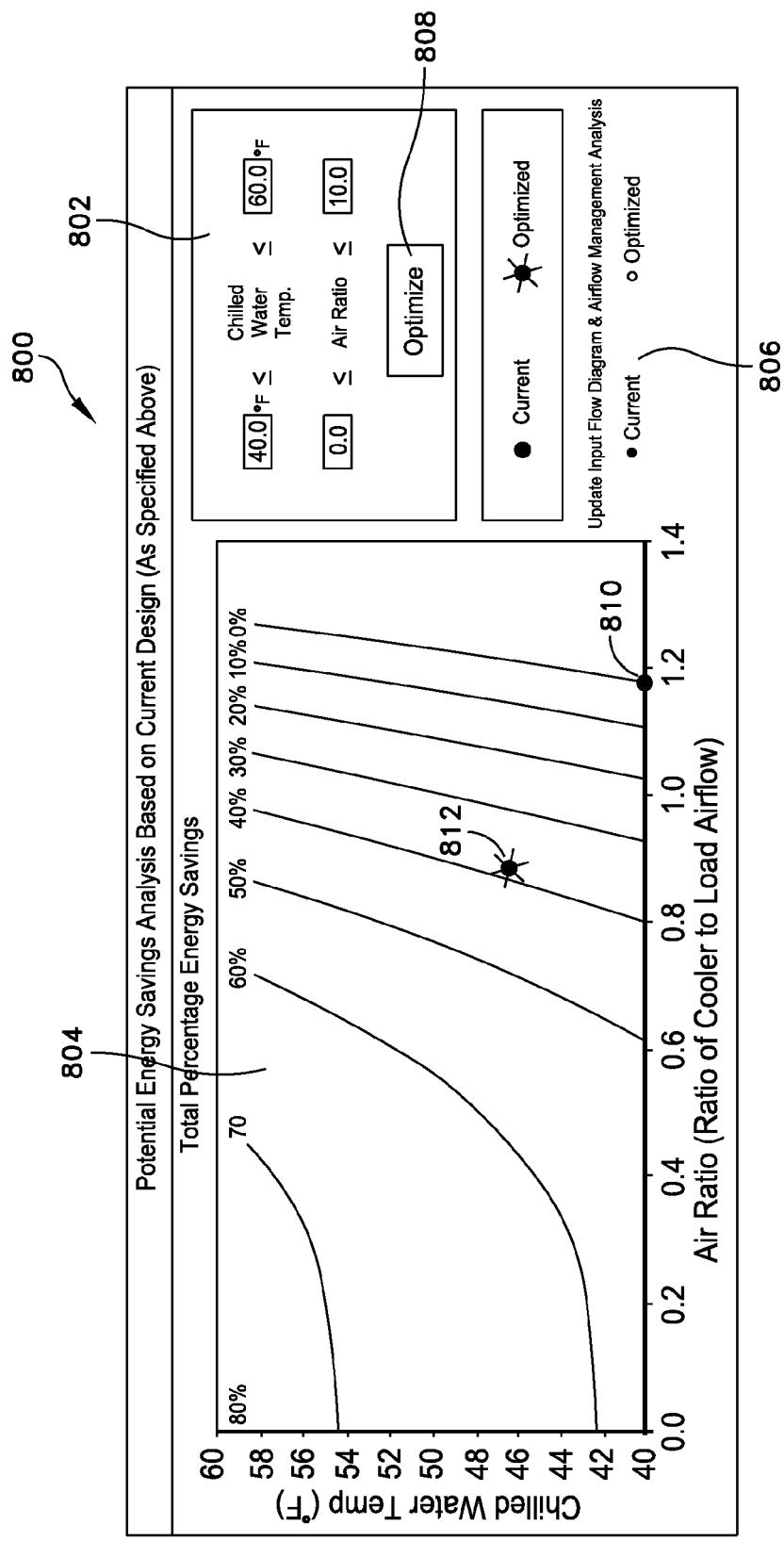
FIG. 8 shows a graphical user interface that may be used to display results of one or more processes conducted in accordance with one embodiment of the invention.

Input area 604 of display screen 600 is used to select the basis for air ratio calculations by the tool. The air ratio may be calculated based on temperature inputs or cooler parameters. If cooler parameters are selected as the basis, then either cooler nameplate rating or specified total cooler airflow may be used. With the "nameplate rating" option the total cooler airflow is computed as the product of an assumed airflow per unit power (e.g., cfm/kW) of the cooler and the total cooler capacity (e.g., kW). If the air ratio is based on "temperature inputs," then the air ratio is computed as $AR=(T_i-T_c)/(T_r-T_s)$. The different options for computing air ratio can be used to provide a "check" on the input data; the current air ratio should be approximately the same number regardless of the calculation method. Input area 606 is used to input the maximum allowable inlet temperature for equipment racks in the data center. Once the data has been entered, the user can activate the "OK" button 610, at which point the tool processes the information and displays the results screens 700 (FIG. 7) and 800 (FIG. 8). In different embodiments, the results screens 700 and 800 may be combined as one screen in a graphical user interface or displayed separately.

The results screen 700 provides airflow management analysis and includes two pie charts 702 and 704 that respectively display cooler airflow and load airflow. The cooler airflow chart 702 indicates the breakdown of airflow from the cooler that is delivered to the load and bypasses the load. The load airflow chart 704 indicates the breakdown of airflow supplied to the load by that which is supplied directly from the cooler and that which is recirculated from the load exhaust. On results screen 700, in box 706, the airflow distribution effectiveness is displayed as a percentage, and in the example provided, the ADE is 92%. The display screen 700 also includes a display box 708 that indicates opportunity for improvement and a display box 710 that provides recommendations. The information displayed in boxes 708 and 710 is based on the ADE calculated. Table 1 provides display information for boxes 708 and 710 based on calculated ADE in one embodiment with ADE expressed as a value between 0 and 1 rather than an a percentage. In other embodiments, other display information may be provided using different ADE thresholds.

TABLE 1

Assessment based on Air Distribution Effectiveness

| Air Distribution Effectiveness | Opportunity for improvement | Recommendation |
| --- | --- | --- |
| $0.7 \leq ADE \leq 1$ | Little | Optimize chiller and cooler settings as suggested below |
| $0.5 \leq ADE < 0.7$ | Some | Consider best practices and repeat analysis if necessary |
| $0 \leq ADE < 0.5$ | Substantial | Implement best practices and repeat analysis |

The results screen 800 (FIG. 8) provides an indication of the potential energy savings available if the chilled water temperature and the air ratio are adjusted to optimal values. Screen 800 includes a section 802 that provides operating ranges for the chilled water temperature and the air ratio. In one embodiment, the user can adjust the ranges by inserting values in the boxes shown. Activation of optimization button 808 causes the tool to perform an optimization routine as discussed above to find optimized air ratio and chilled water values for the data center. Depending on a user's selection in box 806 of user screen 800, the tool can replace the current user values in the airflow diagram screen 400 (FIG. 4) with the optimized values. Screen 800 also includes a graph 804 indicating the total percentage energy savings that can be achieved if the optimal values are used in the data center. The graph includes two data points 810 and 812. Data point 810 represents the current settings for air ratio temperature and chilled water temperature, and data point 812 is the optimized settings for air ratio and chilled water as calculated by the tool. As indicated in the graph, if the settings are changed from the current settings to the optimized settings, an energy savings of approximately 38% may be achieved.

In the embodiment described above, several display screens of a tool used to optimize the design of a data center are described. In one embodiment, the screens, 500, 600, 700 and 800 may be combined to be included in one graphical user interface.

Figure 9:
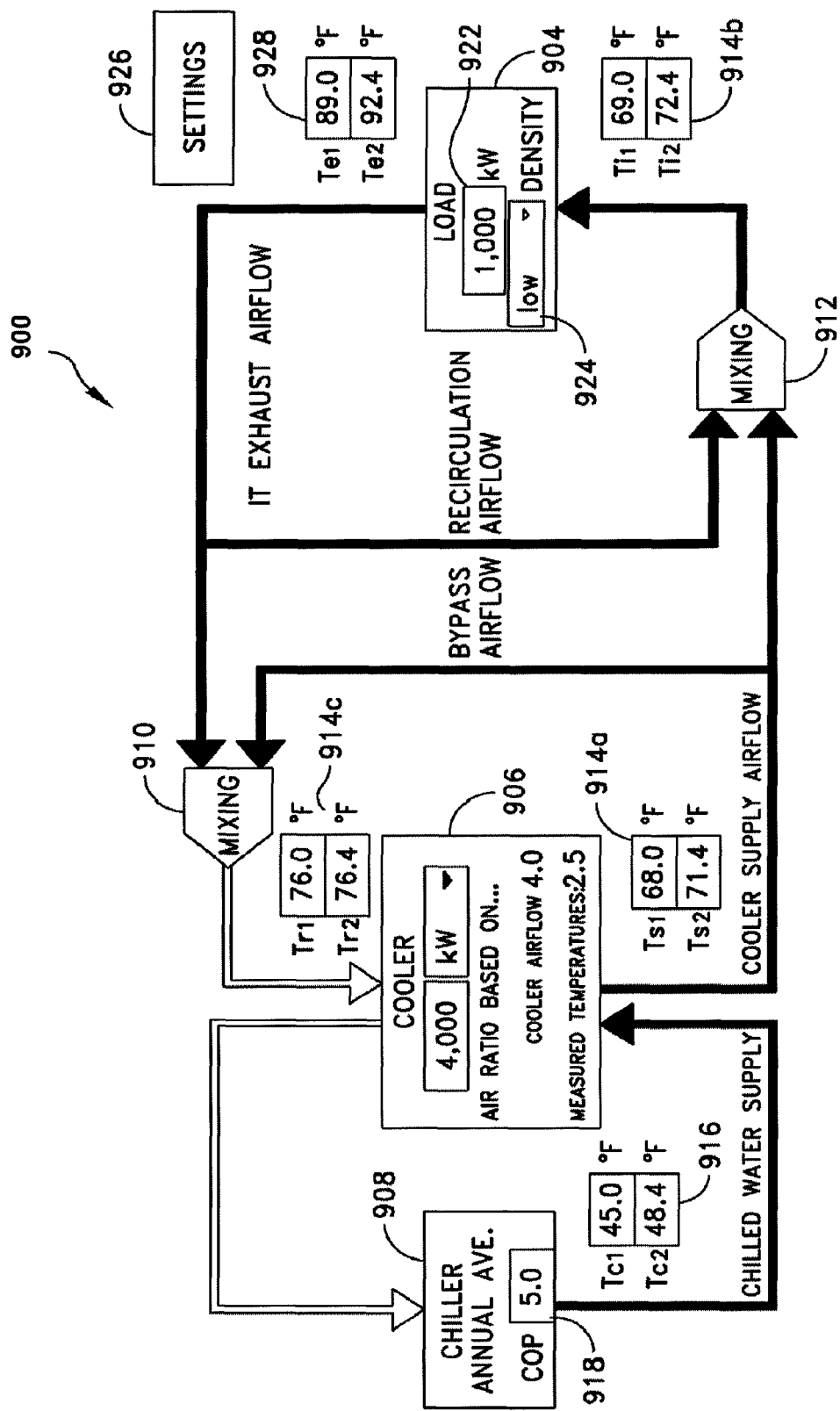
FIG. 9 shows a graphical user interface that may be used to display results of one or more processes conducted in accordance with one embodiment of the invention.
Figure 10:
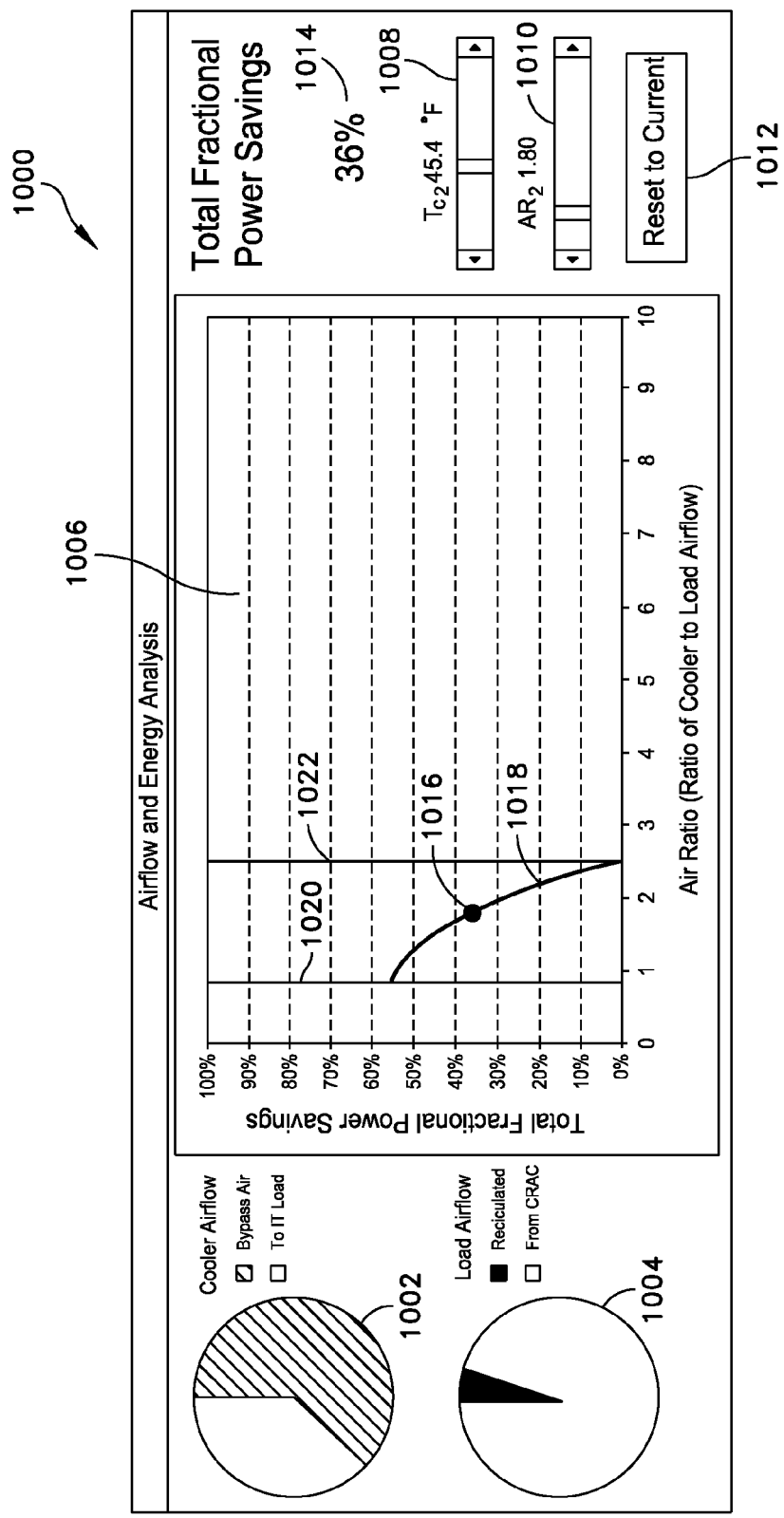
FIG. 10 shows a graphical user interface that may be used to display results of one or more processes conducted in accordance with one embodiment of the invention.

In another embodiment, screens 900 and 1000 (FIGS. 9 and 10) may be displayed by the tool in addition to screens 500, 600, 700 and 800 or in place of one or more of screens 500, 600, 700 and 800. Screen 900 is similar to screen 500 described above, and like elements are numbered similarly with the elements on screen 500 starting with the numeral 5, and the elements on screen 900 starting with the numeral 9. Screen 900 differs from screen 500 in that each of the input or output boxes 514a, 514b, 514c, and 516, and value box 528 are replaced with double value boxes 914a, 914b, 914c, 916 and 928 that indicate current values and optimized values calculated by the tool. Similar to screen 500, screen 900 includes representations of an equipment rack 904, a cooler 906, and a chiller 908, two mixing blocks 910 and 912, settings button 926, an input box 918, and boxes 922 and 924.

Screen 1000 (FIG. 10) includes pie charts 1002 and 1004 that are similar to pie charts 702 and 704 above, and pie charts 1002 and 1004 respectively display the fraction of cooler airflow that bypasses the load (bypass ratio) and the fraction of IT load air which has been recirculated (recirculation ratio). Screen 1000 also includes a graph 1006, two slider bars 1008 and 1010, a reset button 1012, and a box 1014 that displays the total fractional power savings. Slider bar 1008 may be adjusted by the user to test the effect on power savings of changing the chiller coolant temperature from a present value, and slider bar 1010 may be adjusted by the user to test the effect on power savings of changing the air ratio from a present value. Reset button 1012 resets the coolant temperature and the air ratio to the current value.

Graph 1006 shows the total fractional power savings as a function of air ratio. The savings shown result from adjusting the chiller coolant temperature and the air ratio from the current values. On the graph 1006, point 1016 displays the power savings and air ratio for the values set by slider bars 1008 and 1010. For a fixed value of chiller coolant temperature, the point 1014 will move in real-time along curve 1018 as the air ratio slider bar 1010 is adjusted. Curve 1018 is bounded by a lower limit bar 1020 and an upper limit bar 1022. In the example shown in FIG. 10, with the coolant temperature at 45.4 degrees as shown, if the AR is adjusted below the lower limit bar 1020, the inlet temperature to the equipment rack will pass the maximum temperature limit set by the user. If the AR is adjusted above the upper limit bar 1022, then this increases the AR beyond the current set value and is not meaningful from an energy savings perspective, unless the chiller coolant temperature is also increased.

On screen 1000, for a fixed AR, movement of the coolant temperature slider bar 1008, will cause the lower limit bar 1020 and the upper limit bar 1022 to move, and the curve 1018 will also adjust in real time on the display. With adjustments of the slider bar 1010, the pie charts 1002 and 1004 are also updated. In one embodiment, screens 900 and 1000 may be simultaneously displayed and values in both screens may be updated in real-time as the slider bars are adjusted. With embodiments of the invention that use screen 1000, a user can see the effects in real time of adjusting the coolant temperature and the airflow, while other embodiments discussed above, directly calculate and present optimized values.

In embodiments of the invention, as described above, a controller, such as controller 402 in FIG. 4 can be used to measure temperatures that are used as the input to the tool. In at least one embodiment, the controller may also be configured to control the chiller coolant temperature and/or the airflow from one or more coolers such that the energy optimization process can occur in real time. In this embodiment, the controller can detect changes in temperatures in the facility to ensure that inlet temperatures to equipment racks do not exceed maximum levels.

In tools and methods of embodiments discussed above, coolant temperature and cooler airflow are adjusted to maximize power efficiency in a data center. In some servers used in equipment racks in data centers, when the server inlet temperature exceeds a critical temperature (e.g., 77 degrees F.), the servers may increase the speed of internal fans to increase the airflow rate through the servers. The increase in fan speed results in an increase in power draw that could at least partially negate any power savings achieved by increasing coolant temperature and decreasing cooler air flow. In one embodiment that will now be described, the total fractional power savings that is achieved accounts for the increase in power due to an increase in server airflow. In a typical server, an increase in fan speed is directly proportional to an increase in airflow, and a fractional increase fan speed $x=RPM_2/RPM_1$, where $RPM_1$ equals an initial fan speed, and $RPM_2$ equals a second or adjusted fan speed. For a particular configuration, the value of x may be a user input dependent on particular equipment types, or x may be calculated by the tool based on the input temperature to equipment racks.

Fan power typically increases with the cube of airflow rate, and the fraction of total server fan power increase as a result of an increase of fan speed can be expressed as shown in Equation (9).

$$\% \text{ Server Fan Power Increase} = x^3 - 1 \quad \text{Equation (9)}$$

The server fan power can be assumed to be a fixed portion of the total IT load under normal (lower-inlet temperature) conditions. In one embodiment, the fixed portion y is set to 10% and the fan speed can increase by 30% when the inlet temperature exceeds the critical temperature. Values for x and y in different applications may be determined using information from the server manufacturer. The Total Fractional Power Increase (TFPI) as a result of server fan power increase can be determined using Equation (10).

$$TFPI = \frac{\text{Server Fan Power Increase}}{\text{Total Cooling Power}} \quad \text{Equation (10)}$$
$$= \frac{(x^3 - 1) \cdot y \cdot \text{Total } IT \text{ Load}}{P_{c1} + P_{f1}}$$

In Equation 10, $P_c$ and $P_f$ are initial chiller power and cooler fan power respectively. In at least some tools and methods in accordance with the present invention, when calculating the total fractional power savings (TFPS) that can be achieved, the TFPI is subtracted from the power savings that would otherwise be achieved by reducing cooler fan power and increasing chiller coolant temperature. Equation (11) calculates TFPS based on TFPI.

$$TFPS = \left(0.39 \frac{T_{c2} - T_{c1}}{\Delta T_{ref}}\right)\left(\frac{P_{c1}}{P_{c1} + P_{f1}}\right) + \quad \text{Equation (11)}$$
$$\left\{1 - \left(\frac{AR_2}{AR_1}\right)^3\right\}\left(\frac{P_{f1}}{P_{c1} + P_{f1}}\right) - \frac{(x^3 - 1) \cdot \text{Total } IT \text{ Load}}{P_{c1} + P_{f1}}$$

In at least one embodiment, tools and methods can provide outputs to optimize parameters of a data center to maximize Equation (11) using techniques described above.

In embodiments described above, tools are described for evaluating data centers that contain coolers and equipment racks. As readily understood by one of ordinary skill in the art, in other embodiments, processes and systems may be used with cooling providers other than the coolers described herein and with cooling consumers other than equipment racks.

In embodiments described herein, the terms coolant and chilled water are used to describe cooling fluids used with chillers and coolers. As understood by one of ordinary skill in the art, chilled water is one type of coolant, and other types of coolant may also be used in embodiments of the invention. Further, in at least one embodiment, multiple chillers may be used in data centers, and models and tools of the invention may lump the chillers into one representative chiller during optimization processes conducted.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for providing energy assessment and optimization in a data center that includes at least one cooling provider, and at least one cooling consumer, the at least one cooling consumer having cooling requirements, the method comprising:
    receiving data regarding cooling availability and power consumption for the at least one cooling consumer, cooling capacity of the at least one cooling provider, at least one temperature measurement including a temperature of air at an inlet side of the at least one cooling consumer and a temperature of air at the outlet side of the at least one cooling provider, a physical relationship between the at least one cooling consumer and the at least one cooling provider in the data center, and data representative of a coupling factor relating to the physical relationship between the at least one cooling consumer and the at least one cooling provider, wherein the received data regarding the physical relationship is based on configuration and layout of the at least one cooling provider and the at least one cooling consumer;
    storing the received data;
    computing an air ratio based on the data representative of the coupling factor, wherein the air ratio is based on airflow from the at least one cooling provider and airflow of the at least one cooling consumer;
    computing, by a processor, at least one value representative of airflow distribution effectiveness in the data center between the at least one cooling consumer and the at least one cooling provider based on the received data regarding the physical relationship between the at least one cooling consumer and the at least one cooling provider, the received data regarding the power consumption of the at least one cooling consumer, at least one calculation using the received data regarding the at least one temperature measurement including a difference between the temperature of air at the inlet side of the at least one cooling consumer and the temperature of air at the outlet side of the at least one cooling provider, and the air ratio; and
    computing, by the processor, at least one cooling setting for the at least one cooling provider based on the at least one value representative of airflow distribution effectiveness, including the physical relationship between the at least one cooling consumer and the at least one cooling provider in the data center, which results in a reduction in energy usage of the data center while satisfying the cooling requirements of the at least one cooling consumer.

2. The method of claim 1, wherein receiving data includes receiving data regarding temperature of a coolant supplied to the at least one cooling provider.

3. The method of claim 2, further comprising displaying a graphical representation of energy savings of the data center based on the air ratio and the temperature of the coolant supplied to the at least one cooling provider.

4. The method of claim 2, wherein computing the at least one cooling setting includes computing an optimized air ratio setting of the at least one cooling provider.

5. The method of claim 4, wherein computing at least one cooling setting includes computing an optimized temperature of the coolant supplied to the at least one cooling provider.

6. The method of claim 5, further comprising displaying a graphical representation of energy savings of the data center based on the optimized air ratio and the optimized temperature of the coolant supplied to the at least one cooling provider.

7. The method of claim 4, further comprising as a result of computing at least one cooling setting, determining at least one of an optimized return temperature of the at least one cooling provider, an optimized supply temperature of the at least one cooling provider, an optimized input temperature of the at least one cooling consumer, and an optimized exhaust temperature of the at least one cooling consumer.

8. The method of claim 1, further comprising:
    determining a bypass ratio representative of a proportion of bypass airflow relating to airflow delivered to the at least one cooling consumer from the at least one cooling provider; and
    displaying a graphical representation of the proportion of airflow that bypasses the at least one cooling consumer, relating to airflow delivered to the at least one cooling consumer from the at least one cooling provider.

9. The method of claim 1, further comprising:
    computing a recirculation ratio representative of a proportion of recirculated airflow relating to airflow delivered directly to the at least one cooling consumer from the at least one cooling provider; and
    displaying a graphical representation of the proportion of recirculated airflow from an output of the at least one cooling consumer relating to airflow delivered directly to the at least one cooling consumer from the at least one cooling provider.

10. The method of claim 1, wherein computing the at least one cooling setting includes computing a fan power setting, which results in a fractional power savings in the data center while satisfying the cooling requirements of the at least one cooling consumer.

11. A system for presenting a cooling model of a data center that includes at least one cooling provider, and at least one cooling consumer, the at least one cooling consumer having cooling requirements, the system comprising:
    an interface; and
    a controller configured to:
        receive data regarding cooling availability and power consumption for the at least one cooling consumer, cooling capacity of the at least one cooling provider, at least one temperature measurement including a temperature of air at an inlet side of the at least one cooling consumer and a temperature of air at the outlet side of the at least one cooling provider, a physical relationship between the at least one cooling consumer and the at least one cooling provider in the data center, and data representative of a coupling factor relating to the physical relationship between the at least one cooling consumer and the at least one cooling provider, wherein the received data regarding the physical relationship is based on configuration and layout of the at least one cooling provider and the at least one cooling consumer;

store the received data;

compute an air ratio based on the data representative of the coupling factor, wherein the air ratio is based on airflow from the at least one cooling provider and airflow of the at least one cooling consumer;

compute at least one value representative of airflow distribution effectiveness in the data center between the at least one cooling consumer and the at least one cooling provider based on the received data regarding the physical relationship between the at least one cooling consumer and the at least one cooling provider, the received data regarding the power consumption of the at least one cooling consumer, at least one calculation using the received data regarding the at least one temperature measurement including a difference between the temperature of air at the inlet side of the at least one cooling consumer and the temperature of air at the outlet side of the at least one cooling provider, and the air ratio; and compute at least one cooling setting for the at least one cooling provider based on the at least one value representative of airflow distribution effectiveness, including the physical relationship between the at least one cooling consumer and the at least one cooling provider in the data center, which results in a reduction in energy usage of the data center while satisfying the cooling requirements of the at least one cooling consumer.

12. The system of claim 11, wherein the controller is configured to receive data regarding temperature of a coolant supplied to the at least one cooling provider.

13. The system of claim 12, wherein the controller configured to compute the at least one cooling setting is further configured to compute an optimized air ratio setting of the at least one cooling provider.

14. The system of claim 13, wherein the controller configured to compute the at least one cooling setting is further configured to compute an optimized temperature of the coolant supplied to the at least one cooling provider.

15. The system of claim 14, wherein the controller is further configured to display a graphical representation of energy savings of the data center based on the optimized air ratio and the optimized temperature of the coolant supplied to the at least one cooling provider.

16. The system of claim 11, wherein the controller is further configured to:

determine a bypass ratio representative of a proportion of bypass airflow relating to airflow delivered to the at least one cooling consumer from the at least one cooling provider; and display a graphical representation of the proportion of airflow that bypasses the at least one cooling consumer, relating to airflow delivered to the at least one cooling consumer from the at least one cooling provider.

17. The system of claim 11, wherein the controller is configured to:

compute a recirculation ratio representative of a proportion of recirculated airflow relating to airflow delivered directly to the at least one cooling consumer from the at least one cooling provider; and display a graphical representation of the proportion of recirculated airflow from an output of the at least one cooling consumer relating to airflow delivered directly to the at least one cooling consumer from the at least one cooling provider.

18. A non-transitory computer readable medium having stored thereon sequences of instruction including instructions that will cause a processor to:

receive data regarding cooling availability and power consumption for the at least one cooling consumer, cooling capacity of the at least one cooling provider, at least one temperature measurement including a temperature of air at an inlet side of the at least one cooling consumer and a temperature of air at the outlet side of the at least one cooling provider, a physical relationship between the at least one cooling consumer and the at least one cooling provider in the data center, and data representative of a coupling factor relating to the physical relationship between the at least one cooling consumer and the at least one cooling provider, wherein the received data regarding the physical relationship is based on configuration and layout of the at least one cooling provider and the at least one cooling consumer;

store the received data;

compute an air ratio based on the data representative of the coupling factor, wherein the air ratio is based on airflow from the at least one cooling provider and airflow of the at least one cooling consumer;

compute at least one value representative of airflow distribution effectiveness in the data center between the at least one cooling consumer and the at least one cooling provider based on the received data regarding the physical relationship between the at least one cooling consumer and the at least one cooling provider, the received data regarding the power consumption of the at least one cooling consumer, at least one calculation using the received data regarding the at least one temperature measurement including a difference between the temperature of air at the inlet side of the at least one cooling consumer and the temperature of air at the outlet side of the at least one cooling provider, and the air ratio; and compute at least one cooling setting for the at least one cooling provider based on the at least one value representative of airflow distribution effectiveness, including the physical relationship between the at least one cooling consumer and the at least one cooling provider, which results in a reduction in energy usage of the data center while satisfying the cooling requirements of the at least one cooling consumer.

* * * * *